US012623783B2

(12) United States Patent
Chaudhary et al.

(10) Patent No.: US 12,623,783 B2
(45) Date of Patent: May 12, 2026

(54) COLLAPSIBLE ENCLOSURE AND SUSPENSION

(71) Applicant: Skyfront Corp., Redwood City, CA (US)

(72) Inventors: Hemant Chaudhary, San Jose, CA (US); Troy Mestler, Menlo Park, CA (US)

(73) Assignee: Skyfront Corp., Redwood City, CA (US)

( * ) Notice: Subject to any disclaimer, the term of this patent is extended or adjusted under 35 U.S.C. 154(b) by 0 days.

(21) Appl. No.: 19/242,678

(22) Filed: Jun. 18, 2025

(65) Prior Publication Data

US 2025/0388321 A1      Dec. 25, 2025

Related U.S. Application Data

(60) Provisional application No. 63/661,685, filed on Jun. 19, 2024.

(51) Int. Cl.
B64D 1/22      (2006.01)
B64U 10/13      (2023.01)
B64U 101/30      (2023.01)

(52) U.S. Cl.
CPC .............. B64D 1/22 (2013.01); B64U 10/13 (2023.01); B64U 2101/30 (2023.01)

(58) Field of Classification Search
CPC ............ B64U 2101/32; B64U 2101/35; B64U 2101/67; B64U 2101/75; G01V 3/16; B64D 3/00; B64D 3/02; B64C 1/36
See application file for complete search history.

(56) References Cited

U.S. PATENT DOCUMENTS

| | | | | |
|---|---|---|---|---|
| 2,612,327 | A | * 9/1952 | Carlson .................... | B64D 3/02 244/3 |
| 3,044,818 | A | * 7/1962 | Tobey ...................... | B64D 1/22 294/82.26 |
| 3,282,044 | A | * 11/1966 | Maisey ................... | F16L 3/015 376/268 |
| 3,469,872 | A | * 9/1969 | Damm ..................... | B64D 1/04 403/325 |
| 4,984,757 | A | * 1/1991 | Hartung ................... | B64D 1/22 244/137.4 |
| 2023/0393298 | A1* | 12/2023 | Andreasen ............... | G01V 3/16 |

FOREIGN PATENT DOCUMENTS

| | | | | |
|---|---|---|---|---|
| FR | 1405164 A | * 7/1965 | ............. | B65H 75/38 |
| FR | 2993534 A1 | * 1/2014 | ............... | B64D 1/22 |
| WO | WO-2023247053 A1 | * 12/2023 | ............... | G01V 3/16 |

* cited by examiner

*Primary Examiner* — Richard Green
(74) *Attorney, Agent, or Firm* — Van Pelt, Yi & James LLP

(57)      ABSTRACT

A system including an enclosure and a suspension assembly is described. The enclosure includes a first housing section, a second housing section, and a joint link pivotably coupling the first housing section to the second housing section. The joint link couples the housing sections about pivot axes such that the housing sections are movable between an axially aligned operational position and a folded storage position in which the housing sections lie alongside one another. The suspension assembly includes a first end configured to couple to an aerial vehicle and a second end configured to couple to the enclosure. The suspension assembly is configured to be torsion-resistant.

29 Claims, 7 Drawing Sheets

Figures 3C, 3D:
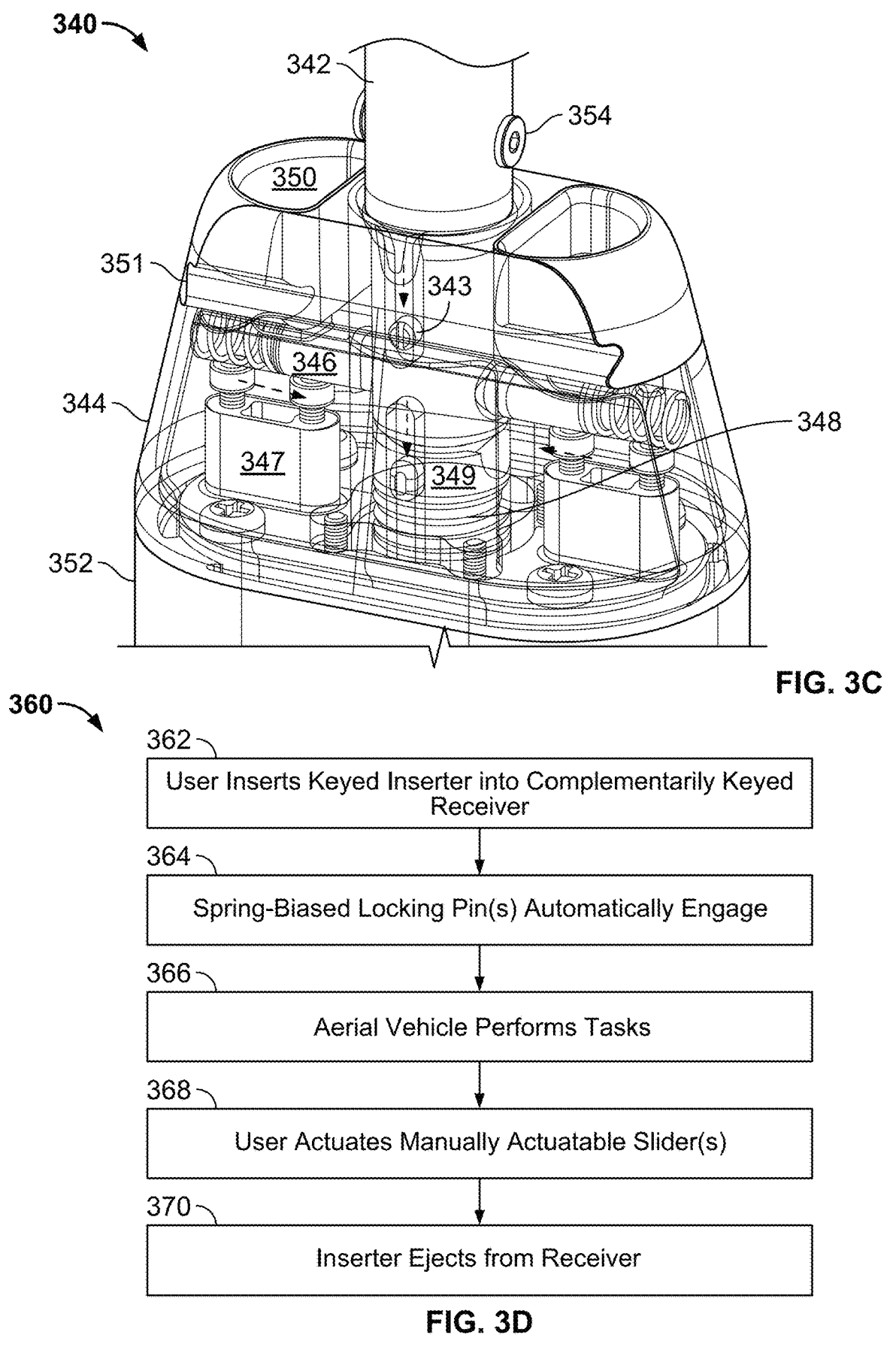

User Inserts Keyed Inserter into Complementarily Keyed Receiver

364

Spring-Biased Locking Pin(s) Automatically Engage

366

Aerial Vehicle Performs Tasks

368

User Actuates Manually Actuatable Slider(s)

370

Inserter Ejects from Receiver

442 — User Unclips Folded Suspension Assembly

444 — Aerial Vehicle Takes Flight, Unfolding Suspension Assembly

446 — Aerial Vehicle Performs Tasks

448 — Aerial Vehicle Lands, at least Partially Folding Suspension Assembly

450 — User Folds/Clips/Stores Suspension Assembly

COLLAPSIBLE ENCLOSURE AND SUSPENSION

CROSS REFERENCE TO OTHER APPLICATIONS

This application claims priority to U.S. Provisional Patent Application No. 63/661,685 entitled COLLAPSIBLE ENCLOSURE AND SUSPENSION FOR A MAGNETOMETER filed Jun. 19, 2024 which is incorporated herein by reference for all purposes.

BACKGROUND OF THE INVENTION

An unmanned aerial vehicle (UAV) may be deployed for a variety of purposes, including exploration (e.g., surveying or mapping of resources) and defense (e.g., ordnance detection). For these purposes a UAV may be equipped with one or more sensors including a magnetometer. A magnetometer may be susceptible to interference from electronics onboard a UAV and may be physically separated from the UAV (e.g., suspended by a rope or arm). However, changes in heading of the sensors relative to the heading of the UAV due to swinging or rotation of a suspension mechanism may introduce fluctuations into the measurements of a magnetometer, and the sensor or suspension mechanism may snag on terrain, vegetation, etc., or otherwise hinder the UAV, especially during takeoff and landing.

BRIEF DESCRIPTION OF THE DRA WINGS

Various embodiments of the invention are disclosed in the following detailed description and the accompanying drawings.

FIG. 3C is a diagram illustrating a perspective view of an enclosure-suspension assembly interface in accordance with some embodiments.

FIG. 3D is a flow diagram illustrating an embodiment of process for utilizing an enclosure and a suspension assembly coupled to an aerial vehicle.

DETAILED DESCRIPTION

Figure 1A:
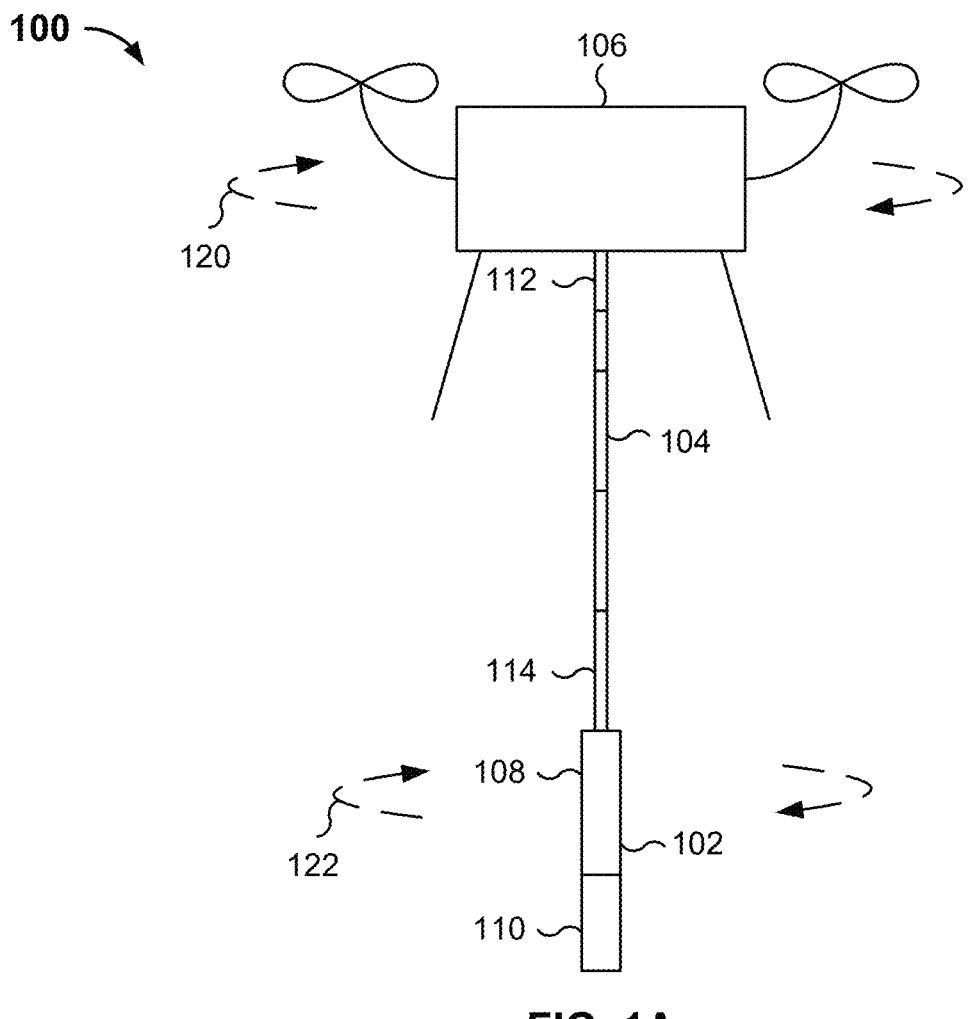
FIG. 1A is a diagram illustrating an aerial vehicle and a sensing system in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system including an enclosure and a suspension assembly is described. The enclosure may house a magnetometer, a sensor, or a transmission device. The enclosure includes a first housing section, a second housing section, and a joint link pivotably coupling the first housing section to the second housing section. The joint link couples the housing sections about pivot axes such that the housing sections are movable between an axially aligned operational position and a folded storage position in which the housing sections lie alongside one another. The suspension assembly includes a first end configured to couple to an aerial vehicle and a second end configured to couple to the enclosure. The suspension assembly is configured to be torsion-resistant. The suspension assembly may also be beneficial for positioning a radio transceiver that requires an unobstructed line-of-sight communication link with a corresponding ground-based or air-based radio. In particular, the suspension assembly may enable placement of the radio transceiver in a location that avoids interference from structural components of the aerial platform, such as landing legs, propellers, or other appendages In some embodiments, the enclosure includes a latch releasably securing the housing sections in the axially aligned operational position. In some embodiments, the collapsible enclosure includes a retention member releasably securing the housing sections in the folded storage position. Other fasteners and/or other support components may be used to releasably secure the housing sections. For example, in some embodiments, fins are used to guide the housing sections into the axially aligned operational position. In various embodiments, the housing sections are electrically connected in the axially aligned operational position, in the folded storage position, or in any other appropriate position (e.g. moving between the positions). For example, a ribbon cable may electrically connect the housing sections. The ribbon cable may be configured with sufficient flexibility and slack to maintain electrical connection between the housing sections as the housing sections move between the axially aligned operational position and the folded storage position.

In some embodiments, the suspension assembly is a pendulous rod. In some embodiments, the suspension assembly is pivotable about two axes. For example, pitch and roll of the suspension assembly and/or the enclosure may be allowed to differ from pitch and roll of the aerial vehicle, while yaw may be fixed relative to the aerial vehicle. In some embodiments, the suspension assembly includes a plurality of elongated rigid links (e.g., rods, tubes, etc.) disposed end-to-end. In some such embodiments, the suspension assembly includes a plurality of hinge joints serially interconnecting adjacent links of the plurality of elongated rigid links. Each hinge joint of the plurality of hinge joints defines a single rotation axis. Successive rotation axes are oriented substantially orthogonally to one another such that the suspension assembly is foldable into a compact tessellated package and such that the suspended enclosure and suspension assembly has pitch and roll degrees of freedom. For example, a first hinge joint may define a first rotation axis equivalent to the pitch axis of the aerial vehicle, while a second hinge joint may define a second rotation axis equivalent to the roll axis of the aerial vehicle. In some embodiments, each hinge joint of the plurality of hinge joints includes a rotation-limiting surface restricting relative angular displacement between the adjacent links. For example, the adjacent links may fold 180 degrees. In some embodiments, the compact tessellated package fits between the aerial vehicle and the ground while the aerial vehicle is in a grounded state. For example, the compact tessellated package may lay sideways underneath the aerial vehicle with a height not exceeding the height of the aerial vehicle's landing gear. In some embodiments, the suspension assembly includes one or more fasteners (e.g., clips) to secure the suspension assembly in the compact tessellated package (e.g., for storage).

In some embodiments, the second end of the suspension assembly (configured to couple to the magnetometer enclosure) includes a keyed male inserter. In some such embodiments, an end of the enclosure includes a complementarily keyed female receiver. In some embodiments, at least one spring-biased locking pin is mounted to the complementarily keyed female receiver. For example, two spring-biased locking pins may be mounted on opposing sides of the keyed female receiver. The at least one spring-biased locking pin is automatically engageable with a locking aperture in the keyed male inserter upon insertion of the keyed male inserter into the complementarily keyed female receiver in a specific orientation. For example, a spring-biased locking pin may be configured to engage in response to the orientation of the enclosure aligning with that of the aerial vehicle. In some such embodiments, at least one manually actuatable slider is mounted to the enclosure and operatively connected to the spring-biased locking pin(s). The at least one manually actuatable slider withdraws the spring-biased locking pin(s) from the locking aperture to permit removal of the keyed male inserter. In some embodiments, the system includes at least one spring configured to oppose the insertion of the keyed male inserter into the complementarily keyed female receiver. For example, a central spring in the complementarily keyed female receiver may be compressed upon insertion of the keyed male inserter. The central spring may secure the keyed male inserter within the complementarily keyed female receiver and/or may eject the keyed male inserter from the complementarily keyed female receiver upon withdrawal of a spring-biased locking pin.

In some embodiments, the system includes a flexible cable. The suspension assembly includes an internal channel for the flexible cable. In some such embodiments, the flexible cable electrically connects the enclosure and the aerial vehicle. For example, the flexible cable may be an ethernet cable. Using the ethernet cable, magnetometer data may be transmitted to the aerial vehicle. In some embodiments, the suspension assembly is foldable into a compact tessellated package and the internal channel is configured to allow for bending of the flexible cable. For example, a suspension assembly includes a plurality of elongated rigid links connected by hinge joints and including an internal channel holding a flexible cable. Near the hinge joints, cutouts are formed in the elongated rigid links. When the elongated rigid links fold at the hinge joints, the cutouts allow the flexible cable to fold without significantly stretching or otherwise changing in length. In some embodiments, tension of the bending of the flexible cable assists in unfolding the suspension assembly. For example, a flexible cable within a suspension assembly may relax into a straight line. Folding the suspension assembly bends the flexible cable, inducing tension. The tension assists in the unfolding of the suspension assembly as the cable returns to its relaxed shape.

Using the system, the heading of the enclosure may remain fixed relative to the aerial vehicle. As a result, fluctuations in the measurements of the magnetometer due to changes in heading may be reduced or counteracted and measurement accuracy may be improved. The axially aligned operational position of the enclosure may reduce interference by physically separating the magnetometer from other electronic components of the system, while the folded storage position may improve the magnetometer enclosure's portability and ease of storage. The suspension assembly may further reduce interference by physically separating the enclosure from the aerial vehicle. By folding, in some embodiments into a compact tessellated package, the aerial vehicle's resistance to snagging on terrain and capability to take off and land with the system may improve using the suspension assembly. Additionally, portability and case of storage may be improved.

A system including an aerial vehicle and a sensing system is also described. The sensing system includes an enclosure and a suspension assembly and is coupled to the aerial vehicle. The enclosure includes a first housing section, a second housing section, and a joint link pivotably coupling the first housing section to the second housing section. The joint link couples the housing sections about pivot axes such that the housing sections are movable between an axially aligned operational position and a folded storage position in which the housing sections lie alongside one another. The suspension assembly includes a first end configured to couple to an aerial vehicle and a second end configured to couple to the enclosure. The suspension assembly is configured to be torsion-resistant.

A method is described. The method includes coupling a suspension assembly to an aerial vehicle and coupling an enclosure to the suspension assembly. The enclosure is configured to house a magnetometer sensor and includes a first housing section, a second housing section (collectively housing sections) and a joint link. The joint link pivotably couples the housing sections about pivot axes such that the housing sections are movable between an axially aligned operational position and a folded storage position. The suspension assembly is configured to be torsion-resistant.

FIG. 1A is a diagram illustrating an aerial vehicle and a sensing system in accordance with some embodiments. In the example shown, system 100 includes enclosure 102, suspension assembly 104, and aerial vehicle 106. Enclosure 102 includes a first housing section 108 and a second housing section 110 including a magnetometer (not labeled). Suspension assembly 104 includes elongated rigid links 114 (only one of which is labeled) including shorter links 112 (only one of which is labeled). Labeled shorter link 112 is located at a first end of suspension assembly 104 and is configured to couple to aerial vehicle 106. In various embodiments, suspension assembly 104 and aerial vehicle 106 are coupled using a rigid link, a dampening system (e.g., cushions, shock absorbers, etc.), or any other appropriate coupling system. Labeled elongated rigid link 114 is located at a second end of suspension assembly 104 and is configured to couple to first housing section 108. In some embodiments, the second end of suspension assembly 104 includes a keyed male inserter. In some such embodiments, first housing section 108 includes a complementarily keyed female receiver.

In some embodiments, suspension assembly 104 is a pendulous rod. In some embodiments, suspension assembly 104 includes a plurality of hinge joints. The hinge joints serially interconnect adjacent links of the elongated rigid links 114. Each hinge joint defines a single rotation axis. Successive rotation axes are oriented substantially orthogonally to one another such that suspension assembly 104 is foldable into a compact tessellated package (analogous to FIG. 1B). For example, a hinge joint may define a first rotation axis equivalent to the pitch axis of the aerial vehicle, while a next hinge joint may define a second rotation axis equivalent to the roll axis of the aerial vehicle. In some embodiments, each hinge joint includes a rotation-limiting surface restricting relative angular displacement between the adjacent links. For example, adjacent links may be able to fold 180 degrees (i.e., in only one direction from the position depicted in FIG. 1A). Suspension assembly 104 may also include an internal flexible cable (or another appropriate mechanism, e.g., springs) that straightens suspension assembly 104 into a line as depicted in FIG. 1A. Portions of suspension assembly 104 (and by extension enclosure 102) may thus be able to rotate along the yaw and roll axes of the aerial vehicle and return to the depicted position (e.g., in response to snagging on terrain) while retaining a fixed yaw relative to the aerial vehicle. Therefore, reliability and snag resistance of the magnetometer may be improved.

Suspension assembly 104 is configured to be torsion-resistant. Thus the yaw of enclosure 102 stays fixed relative to aerial vehicle 106. This may reduce changes in heading (e.g., due to wind, due to enclosure 102 snagging on terrain, etc.) of enclosure 102 and reduce interference in magnetometer measurements. As aerial vehicle 106 rotates as indicated by dashed arrows 120, enclosure 102 rotates in an analogous manner as indicated by dashed arrows 122. As a result, changes in heading of enclosure 102 may be predicted and accounted for based on changes in heading of aerial vehicle 106 (e.g., via gyroscopes, accelerometers, etc. onboard aerial vehicle 106). This may further reduce interference in magnetometer measurements. Thus accuracy of magnetometer measurements may be improved using system 100.

Figure 1B:
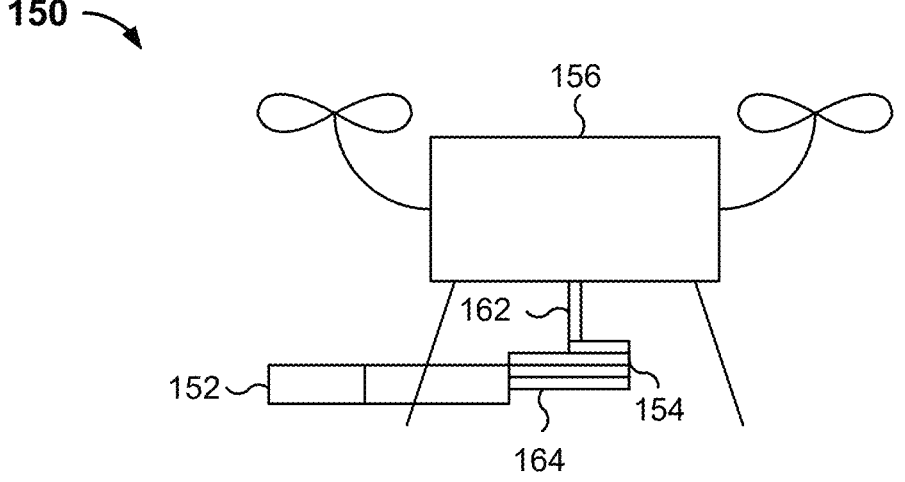
FIG. 1B is a diagram illustrating an aerial vehicle and a sensing system in accordance with some embodiments.

FIG. 1B is a diagram illustrating an aerial vehicle and a sensing system in accordance with some embodiments. In the example shown, system 150 includes enclosure 152, suspension assembly 154, and aerial vehicle 156. In some embodiments, system 150 is analogous to system 100 of FIG. 1A. Aerial vehicle 156 is in a grounded state. Suspension assembly 154 is folded into a compact tessellated package. In some embodiments, suspension assembly 154 includes one or more fasteners to secure it in the compact tessellated package (e.g., for storage). The fasteners may be manually released prior to aerial vehicle 156 taking flight, though suspension assembly 154 may remain in a compact tessellated package after the fasteners are released. Shorter link 162, attached to aerial vehicle 156, is sufficiently short to allow suspension assembly 154 to fit between aerial vehicle 156 and the ground. In some embodiments, as aerial vehicle 156 takes flight, suspension assembly 154 unfolds from the compact tessellated package (e.g., via gravity, via tension of a flexible cable, etc.) into a line analogous to suspension assembly 104 of FIG. 1A. During landing, suspension assembly 154 may fold fully (i.e., into the compact tessellated package) or partially (e.g., into an 'L' shape). For example, a hinge joint directly below shorter link 162 may fold approximately 90 degrees as can be seen in FIG. 1B, while the remainder of suspension assembly 154 may not fold. Thus, using system 150, hinderance of a magnetometer during takeoff and landing may be reduced.

Figure 2A:
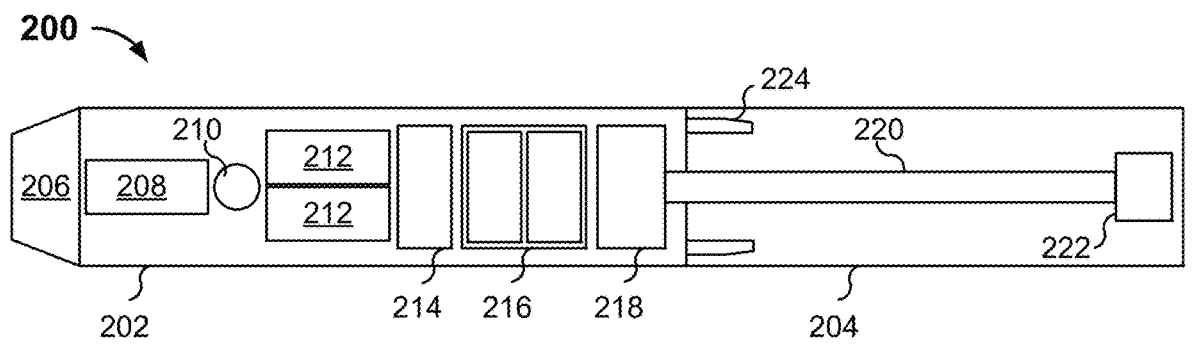
FIG. 2A is a diagram illustrating an embodiment of an enclosure in an axially aligned operational position.

FIG. 2A is a diagram illustrating an embodiment of an enclosure in an axially aligned operational position. In some embodiments, enclosure 200 is analogous to enclosure 102 and/or enclosure 152 of FIGS. 1A-1B. In the embodiment shown, enclosure 200 includes first housing section 202 and second housing section 204. First housing section 202 includes coupler 206, global navigation satellite system (GNSS) antenna 208, power button 210, batteries 212, power board 214, logic boards 216, magnetometer sensor head 218, and an upper portion of ribbon cable 220. Second housing section 204 includes a lower portion of ribbon cable 220 and magnetometer sensor tail 222. Coupled to first housing section 202 are fins 224 (only one of which is labeled). Other components may be included. For example, in various embodiments, one or more global positioning systems (GPSs), inertial measurement units (IMUs), processors, memory devices, data transfer mechanisms (e.g., ethernet ports), or any other appropriate component(s) are included.

In some embodiments, coupler 206 comprises a keyed female receiver. The keyed female receiver is keyed complementarily to a keyed male inserter of a suspension assembly (e.g., suspension assembly 104 of FIG. 1A). In some embodiments, enclosure 200 includes at least one spring-biased locking pin mounted to the keyed female receiver. In some such embodiments, at least one manually actuatable slider is mounted to enclosure 200 and is operatively connected to the at least one spring-biased locking pin.

Fins 224 may be used to guide second housing section 204 into the axially aligned operational position. Other support components and/or fasteners may be used to releasably secure first housing section 202 and second housing section 204. Ribbon cable 220 electrically connects magnetometer sensor tail 222 to magnetometer sensor head 218 in the axially aligned operational position. In some embodiments, ribbon cable 220 maintains this electrical connection in other configurations of enclosure 200 (e.g., in a folded storage position). In the axially aligned operational position, magnetometer sensor tail 222 is physically separated from other electrical components via ribbon cable 220. Enclosure 200 may be one meter or longer in the axially aligned operational position.

Figure 2B:
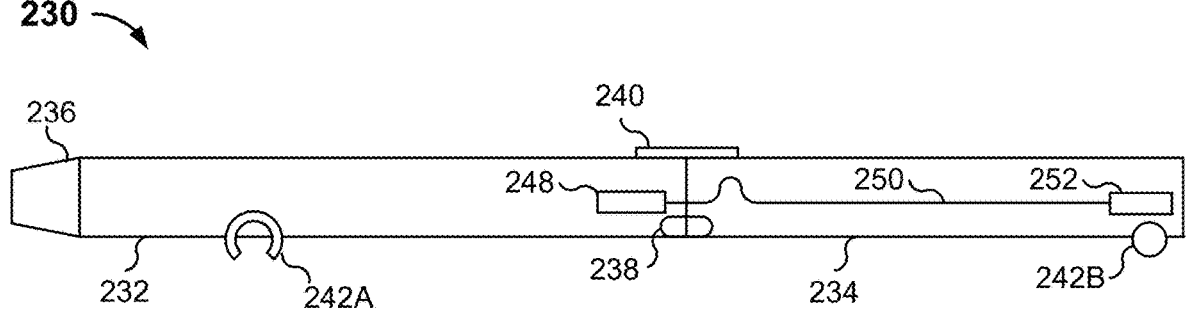
FIG. 2B is a diagram illustrating a side view of an embodiment of an enclosure.

FIG. 2B is a diagram illustrating a side view of an embodiment of a magnetometer enclosure. In some embodiments, enclosure 230 is analogous to enclosure 200 of FIG. 2A. In the embodiment shown, enclosure 230 includes first housing section 232, second housing section 234, coupler 236, joint link 238, latch 240, retention member portions 242A and 242B (collectively retention member 242), magnetometer sensor head 248, ribbon cable 250, and magnetometer sensor tail 252. Other components, including GNSS systems, user interface elements, batteries, power boards, logic boards, GPS systems, IMU systems, processors, memory devices data transfer mechanisms, etc., may be present.

Latch 240 releasably secures first housing section 232 and second housing section 234 in the axially aligned operational position. Joint link 238 allows first housing section 232 and second housing section 234 to fold upon release (e.g., manual release) of latch 240. In some embodiments, joint link 238 includes two pivot axes. The pivot axes may allow first housing section 232 and second housing section 234 to fold parallel to each other (i.e., 180 degrees, analogous to FIG. 2C) in a folded storage position. Retention member 242 is configured to releasably secure first housing section 232 and second housing section 234 in the folded storage position. Other fasteners and/or other support components may be used to releasably secure first housing section 232 and second housing section 234. Ribbon cable 250 connects magnetometer sensor head 248 and magnetometer sensor tail 252. Ribbon cable 250 can be seen to have flexibility and slack near the seam between first housing section 232 and second housing section 234. The slack may allow ribbon cable 250 to maintain electrical connection as first housing section 232 and second housing section 234 fold or unfold (e.g., to and from a folded storage position).

Figure 2C:
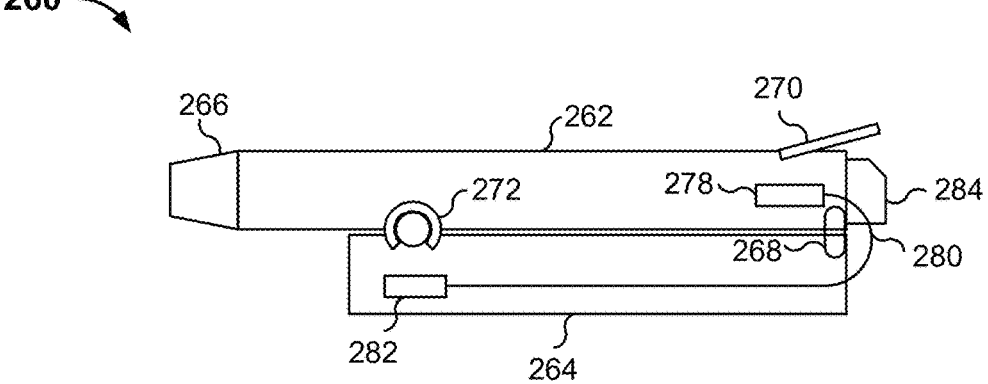
FIG. 2C is a diagram illustrating an embodiment of an enclosure in a folded storage position.

FIG. 2C is a diagram illustrating an embodiment of an enclosure in a folded storage position. In some embodiments, enclosure 260 is analogous to enclosure 230 of FIG. 2B. In the embodiment shown, enclosure 260 includes first housing section 262, second housing section 264, coupler 266, joint link 268, latch 270, retention member 272, magnetometer sensor head 278, ribbon cable 280, magnetometer sensor tail 282, and fins 284. Other components, including GNSS systems, user interface elements, batteries, power boards, logic boards, GPS systems, IMU systems, processors, memory devices data transfer mechanisms, etc., may be present.

Retention member 272 releasably secures first housing section 232 and second housing section 234 in the folded storage position. Joint link 268 allows first housing section 262 and second housing section 264 to unfold upon release (e.g., manual release) of retention member 272. In some embodiments, joint link 268 includes two pivot axes. The pivot axes may allow first housing section 232 and second housing section 234 to unfold aligned with each other (i.e., 180 degrees, analogous to FIG. 2B) in an axially aligned operational position. Latch 270 is configured to releasably secure first housing section 262 and second housing section 264 in the axially aligned operational position. Fins 284 are configured to align second housing section 264 with first housing section 262 during the unfolding. Other fasteners and/or other support components may be used to releasably secure first housing section 232 and second housing section 234. Ribbon cable 280 connects magnetometer sensor head 278 and magnetometer sensor tail 282. Ribbon cable 280 maintains the connection during unfolding (e.g., analogous to ribbon cable 250 of FIG. 2B).

Figure 2D:
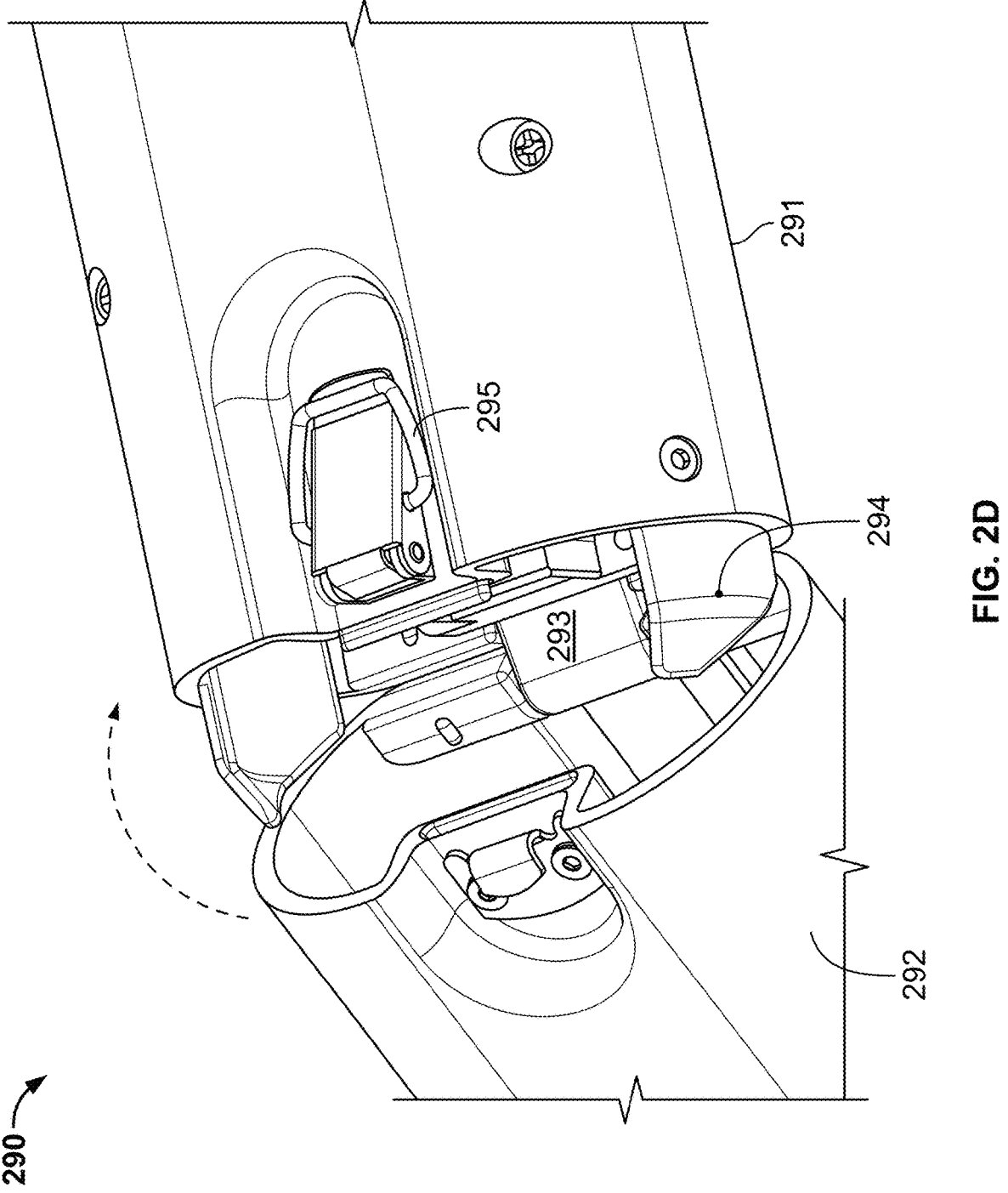
FIG. 2D is a diagram illustrating a perspective view of an embodiment of an enclosure.

FIG. 2D is a diagram illustrating a perspective view of an embodiment of an enclosure. Enclosure 290 includes first housing section 291, second housing section 292, and joint link 293 coupling first housing section 291 to second housing section 292. Joint link 293 pivotably couples first housing section 291 and second housing section 292 about pivot axes such that first housing section 291 and second housing section 292 move between an axially aligned operational position and a folded storage position. In some embodiments, joint link 293 includes two pivot axes. In the embodiment shown, second housing section 292 is moving in the direction of the dashed arrow (toward the axially aligned operational position). Fins 294 are configured to align second housing section 292 with first housing section 291 during the moving, and latch 295 releasably secures first housing section 291 and second housing section 292 in the axially aligned operational position. Other fasteners and/or other support components may be used.

Figure 3A:
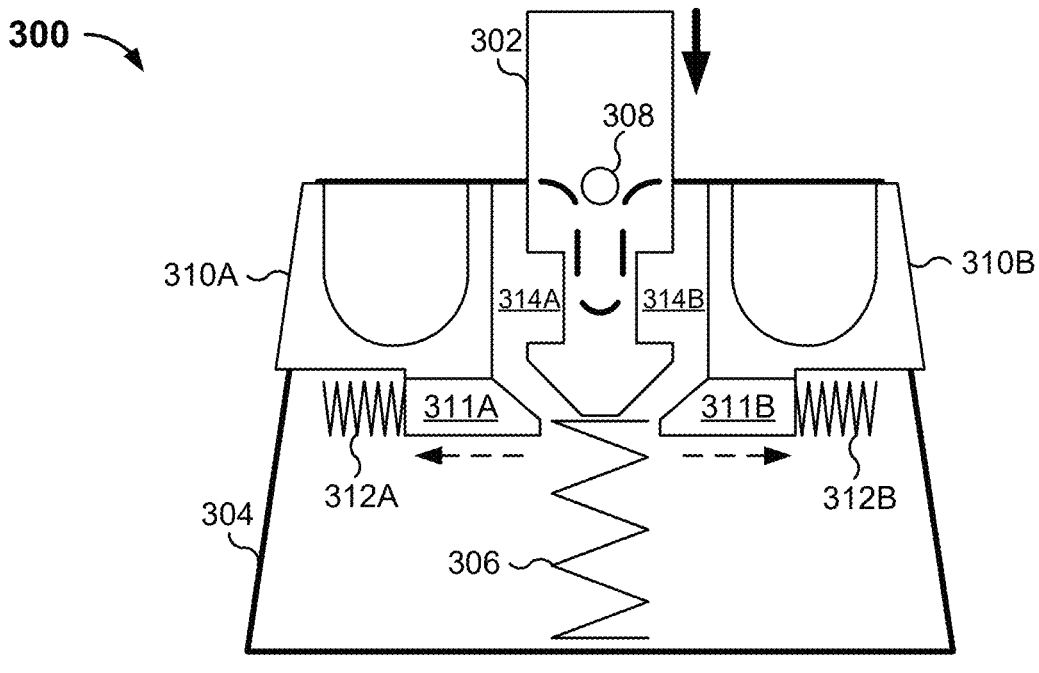
FIG. 3A is a diagram illustrating an enclosure-suspension assembly interface in accordance with some embodiments.

FIG. 3A is a diagram illustrating an enclosure-suspension assembly interface in accordance with some embodiments. In the example shown, coupler 300 includes keyed male inserter 302 and complementarily keyed female receiver 304. In some embodiments, complementarily keyed female receiver 304 is an end of an enclosure (e.g., analogous to coupler 206 of FIG. 2A). In some embodiments, keyed male inserter is an end of a suspension assembly (e.g., suspension assembly 104 of FIG. 1A). In the embodiment shown, spring-biased locking pin 311A and spring-biased locking pin 311B are mounted to opposite sides of complementarily keyed female receiver 304 via springs 312A, 312B, respectively. Spring-biased locking pins 311A, 311B are automatically engageable with locking apertures 314A, 314B in keyed male inserter 302 upon insertion of keyed male inserter 302 into complementarily keyed female receiver 304 in a specific orientation. Knob 308 protrudes from keyed male inserter 302 and guides keyed male inserter 302 into the specific orientation by sliding into a track indicated by the dashed line of complementarily keyed female receiver 304. Other methods of orienting keyed male inserter 302 may be used. Manually actuatable slider 310A and manually actuatable slider 310B are mounted to enclosure 304 (e.g., via springs, sliders, etc.) and are operatively connected to spring-biased locking pin 311A and spring-biased locking pin 311B, respectively. Central spring 306 is configured to oppose the insertion of keyed male inserter 302 into complementarily keyed female receiver 304, and is compressed when keyed male inserter 302 is inserted. Other configurations of one or more springs may be used. The insertion of keyed male inserter 302 (shown by the solid downward arrow) also displaces spring-biased locking pin 311A, spring-biased locking pin 311B, manually actuatable slider 310A, and manually actuatable slider 310B laterally outward (indicated by the dashed arrows). Spring 312A and spring 312B then engage spring-biased locking pin 311A and spring-biased locking pin 311B, respectively, when keyed male inserter 302 is fully inserted, coupling keyed male inserter 302 to complementarily keyed female receiver 304 in a manner analogous to FIG. 3B. Ease of assembly of a system using coupler 300 (e.g., system 100 of FIG. 1A) may thus be improved.

Figure 3B:
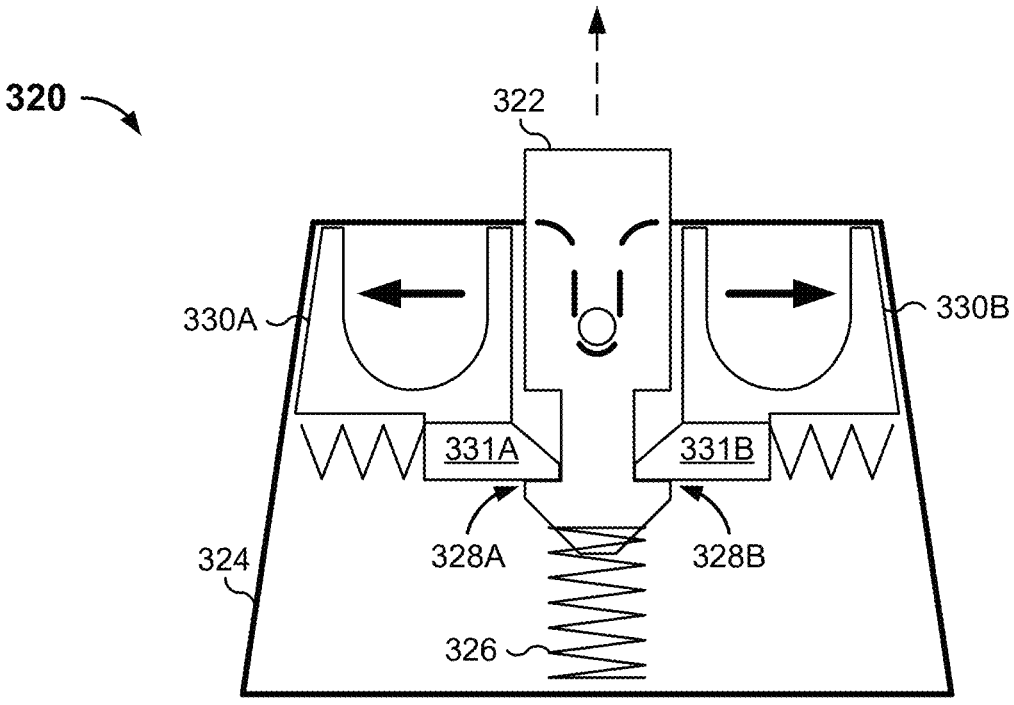
FIG. 3B is a diagram illustrating an enclosure-suspension assembly interface in accordance with some embodiments.

FIG. 3B is a diagram illustrating an enclosure-suspension assembly interface in accordance with some embodiments.

In the example shown, coupler 320 includes keyed male inserter 322 coupled to complementarily keyed female receiver 324. In some embodiments, coupler 320 is analogous to coupler 300 of FIG. 3A. In the embodiment shown, coupler 320 includes central spring 326, spring-biased locking pin 331A, spring-biased locking pin 331B, manually actuatable slider 330A, and manually actuatable slider 330B. Spring-biased locking pin 331A and spring-biased locking pin 331B are engaged, coupling keyed male inserter 322 to complementarily keyed female receiver 324. In some embodiments, central spring 326 secures keyed male inserter 322 within complementarily keyed female receiver 324 by forcing keyed male inserter 322 against spring-biased locking pin 331A and spring-biased locking pin 331B at surface 328A and surface 328B, respectively. Using central spring 326 (or another appropriate configuration of springs), movement of keyed male inserter 322 relative to complementarily keyed female receiver 324 may thus be reduced. As such, wear on keyed male inserter 322 and spring-biased locking pins 331A-331B may be reduced and longevity of coupler 320 may be improved.

Manually actuatable slider 330A and manually actuatable slider 330B may be pulled apart (indicated by the solid arrows), withdrawing spring-biased locking pin 331A and spring-biased locking pin 331B, respectively, to permit removal of keyed male inserter 322. In some embodiments, central spring 326 is configured to eject keyed male inserter 322 from complementarily keyed female receiver 324 upon withdrawal of spring-biased locking pins 331A-331B (shown by the dashed arrow). Ease of disassembly of a system using coupler 320 (e.g., system 100 of FIG. 1A) may thus be improved. Similarly, transportation and storage of the system may be improved using coupler 320.

FIG. 3C is a diagram illustrating a perspective view of an enclosure-suspension assembly interface in accordance with some embodiments. In the example shown, coupler 340 includes keyed male inserter 342 coupled to complementarily keyed female receiver 344. In some embodiments, coupler 320 is analogous to coupler 320 of FIG. 3B. Complementarily keyed female receiver includes support structures 347, 349, and 351, onto which are mounted spring-biased locking pins (only one of which is labeled), central spring 348, and manually actuatable sliders (only one of which is labeled), respectively. Other support mechanisms may be used. Knob 343 protrudes from keyed male inserter 342 and guides keyed male inserter 342 into the specific orientation shown. Support structure 349 and spring-biased locking pins 346 may also guide keyed male inserter 342 into the specific orientation.

Aperture 354 is configured to allow a cable within an internal channel of keyed male inserter (e.g., an ethernet cable) to attach to enclosure 352. In various embodiments, the cable electrically connects enclosure 352 to a suspension assembly, electrically connects enclosure 352 to an aerial vehicle, assists in unfolding a suspension assembly, supports a suspension assembly (e.g., redistributes load off of hinge joints of the suspension assembly), or performs any other appropriate function.

FIG. 3D is a flow diagram illustrating an embodiment of a process for utilizing an enclosure and a suspension assembly coupled to an aerial vehicle. In the example shown, process 360 is implemented using system 100, system 150, coupler 300, coupler 320, coupler 340, etc. In the embodiment shown, in 362, a user (e.g., an operator of the aerial vehicle) inserts a keyed male inserter of the suspension assembly into a complementarily keyed female receiver of the enclosure in a specific orientation. In 364, at least one spring-biased locking pin mounted to the complementarily keyed female receiver automatically engages with a locking aperture in the keyed male inserter to secure the keyed male inserter to the complementarily keyed female receiver in the specific orientation (e.g., analogous to coupler 320). In 366, the aerial vehicle performs any appropriate tasks (e.g., mapping, surveying, ordnance detection, etc.) with the enclosure coupled to the suspension assembly. For example, the aerial vehicle may take flight, record magnetometer measurements across an area, return to its original location, and land. In 368, the user actuates at least one manually actuatable slider on the complementarily keyed female receiver. The spring-biased locking pin(s) are operatively connected to the manually actuatable slider(s) and are withdrawn from the keyed male inserter. In 370, the keyed male inserter is ejected from the complementarily keyed female receiver (e.g., via at least one spring configured to oppose the insertion of the keyed male inserter).

Figure 4A:
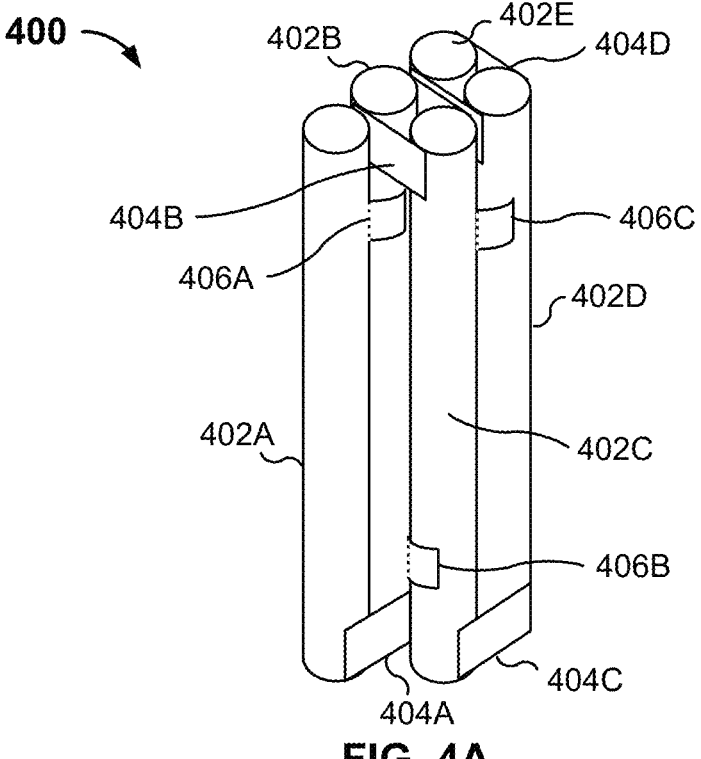
FIG. 4A is a diagram illustrating an embodiment of a portion of a suspension assembly folded into a compact tessellated package.

FIG. 4A is a diagram illustrating an embodiment of a portion of a suspension assembly folded into a compact tessellated package. In some embodiments, the suspension assembly is analogous to suspension assembly 154 of FIG. 1B. In the embodiment shown, portion 400 includes elongated rigid links 402A-402E, hinge joints 404A-404D, and clips 406A-406C. Hinge joints 404A-404D serially interconnect adjacent links of elongated rigid links 402A-402E. For example, hinge joint 404A can be seen to interconnect elongated rigid link 402A and elongated rigid link 402B. Hinge joints 404A-404D each define a single rotation axis. Successive rotation axes are oriented substantially orthogonally to one another such that the suspension assembly is foldable into the compact tessellated package. In some embodiments, hinge joints 404A-404D each include a rotation-limiting surface restricting relative angular displacement between adjacent links. For example, elongated rigid link 402A may rotate downward via hinge joint 404A to axially align with elongated rigid link 402B. However, elongated rigid link 402A may not be able to rotate further (i.e., upward toward elongated rigid link 402E).

While axially aligned, elongated rigid links 402A-402E may suspend a load (e.g., a magnetometer sensor) directly below an aerial vehicle. This configuration may reduce gravity-induced and drag-induced torque, improving the flight performance of the aerial vehicle.

Though elongated rigid links 402A-402E are shown as being equal in length, other lengths of elongated rigid link may be used. For example, a shorter link at an end of the suspension assembly may allow the compact tessellated package to fit between an aerial vehicle and the ground while the aerial vehicle is in a grounded state.

Clips 406A-406C are attached to elongated rigid links 402A-402C, respectively, and secure portion 400 in the compact tessellated package. Other fasteners or support structures may be used. While in the compact tessellated package, transportation and storage of the suspension assembly may be improved. Clips 406A-406C may be manually released prior to an aerial vehicle taking flight, though the suspension assembly may remain in the compact tessellated package after clips 406A-406C are released. In some embodiments, elongated rigid links 402A-402E include an internal channel for a flexible cable. In various such embodiments, the flexible cable electrically connects an enclosure to an aerial vehicle (e.g., enabling data transmission), assists in unfolding the suspension assembly, supports the suspension assembly (e.g., by redistributing load off of hinge joints 404A-404D), or performs any other appropriate function.

Figure 4B:
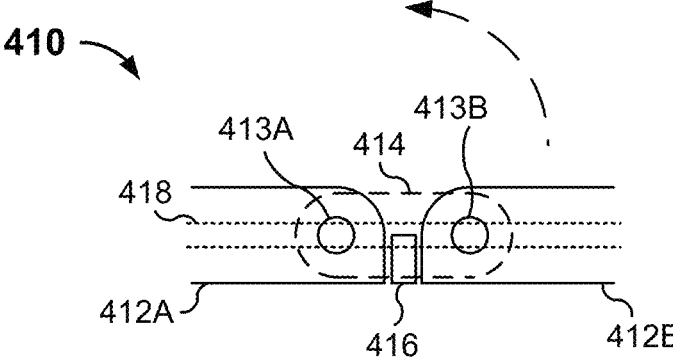
FIG. 4B is a diagram illustrating an embodiment of a hinge joint of a suspension assembly in an unfolded position.

FIG. 4B is a diagram illustrating an embodiment of a hinge joint of a suspension assembly in an unfolded position. In some embodiments, hinge joint 410 is analogous to hinge joints 404A-404D of FIG. 4A. In the embodiment shown, hinge joint 410 connects elongated rigid link 412A and elongated rigid link 412B and includes hinge joint link 414. Hinge joint link 414 connects to elongated rigid link 412A via pivot axis 413A and connects to elongated rigid link 412B via pivot axis 413B. With hinge joint link 414, pivot axis 413A, and pivot axis 413B, elongated rigid link 412B is able to rotate 180 degrees in the direction of the dashed arrow, from axial alignment with elongated rigid link 412A (as shown) to a folded position analogous to FIG. 4C. Rotation-limiting surface 416 restricts angular displacement between elongated rigid links 412A-412B in the opposite direction. In some embodiments, the suspension assembly includes an internal channel for flexible cable 418. The internal channel may be configured to allow for bending of the flexible cable (e.g., alongside rotation of elongated rigid link 412B relative to elongated rigid link 412A). In various embodiments, flexible cable 418 electrically connects an enclosure to an aerial vehicle (e.g., enabling data transmission), assists in unfolding hinge joint 410, supports the suspension assembly (e.g., by redistributing load off of hinge joint link 414), or performs any other appropriate function.

Figure 4C:
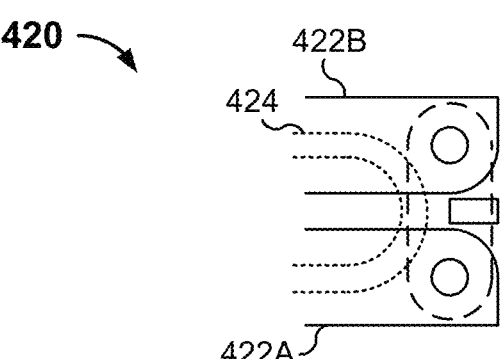
FIG. 4C is a diagram illustrating an embodiment of a hinge joint of a suspension assembly in a folded position.

FIG. 4C is a diagram illustrating an embodiment of a hinge joint of a suspension assembly in a folded position. In some embodiments, hinge joint 420 is analogous to hinge joint 410 of FIG. 4B. In the embodiment shown, hinge joint 420 connects elongated rigid link 422A and elongated rigid link 422B. An internal channel of the suspension assembly has been configured to allow for bending of flexible cable 424 (e.g., via cutouts in elongated rigid links 422A-422B). In some embodiments, tension of the bending of flexible cable 424 assists in unfolding hinge joint 420 (e.g., to a position analogous to hinge joint 410 of FIG. 4B).

Figure 4D:
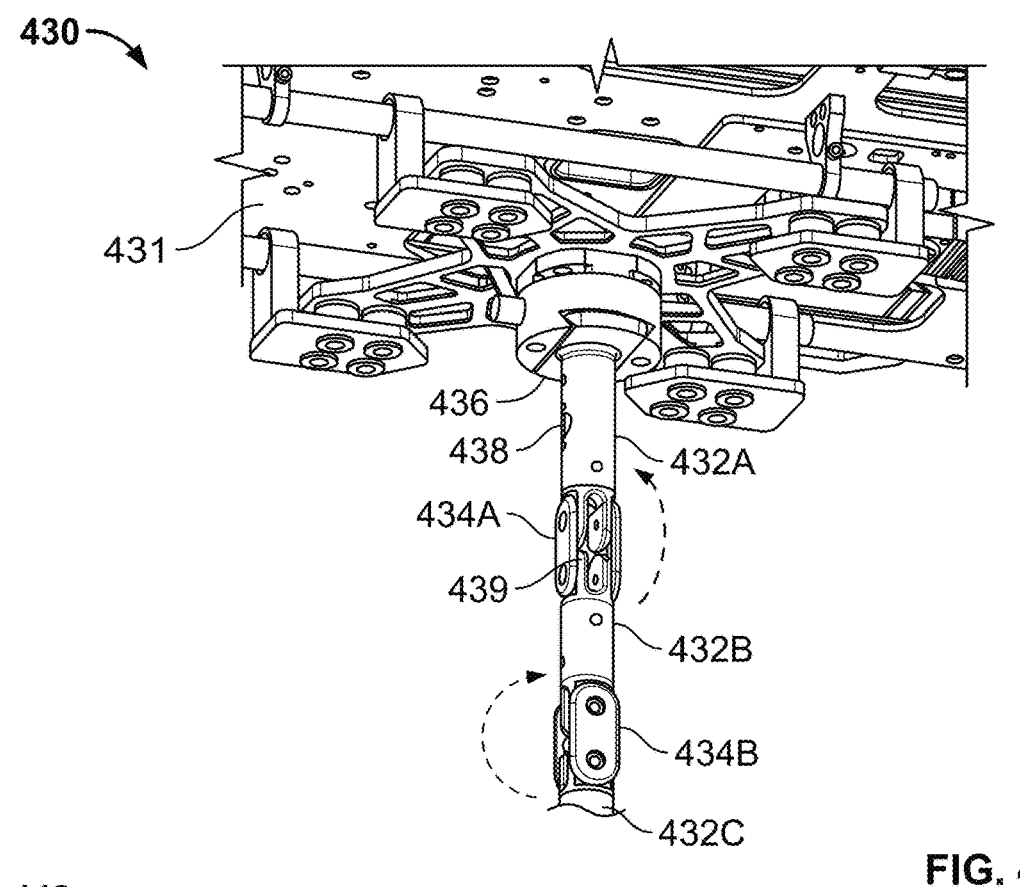
FIG. 4D is a diagram illustrating an embodiment of a system including a suspension assembly coupled to an aerial vehicle.

FIG. 4D is a diagram illustrating an embodiment of a system including a suspension assembly coupled to an aerial vehicle. In some embodiments, system 430 is analogous to suspension assembly 104 and aerial vehicle 106 of FIG. 1A. In the embodiment shown, the suspension assembly includes elongated rigid link 432A, elongated rigid link 432B, and elongated rigid link 432C, interconnected by hinge joint 434A and hinge joint 434B. The suspension assembly is coupled to aerial vehicle 431 via coupler 436. In various embodiments, coupler 436 includes a rigid link, a dampening system (e.g., cushions, shock absorbers, etc.), or any other appropriate coupling system. The suspension assembly includes an internal channel for a flexible cable, including cutouts 439 at hinge joint 434A and hinge joint 434B (only one of which is labeled) to allow for bending of the flexible cable, and aperture 438. Hinge joint 434A and hinge joint 434B each define a single rotation axis (indicated by the dashed arrows). Successive rotation axes are oriented substantially orthogonally to one another such that the suspension assembly is foldable into a compact tessellated package (analogous to FIG. 4A). In some embodiments, the compact tessellated package fits between aerial vehicle 431 and the ground when aerial vehicle 431 is in a grounded state.

The suspension assembly is configured to be torsion-resistant. Hinge joint 434A and hinge joint 434B allow the suspension assembly to rotate along the roll axis and pitch axis of aerial vehicle 431, respectively, the yaw of the suspension assembly (and, by extension, a coupled magnetometer sensor) stays fixed relative to aerial vehicle 431. As a result, fluctuations in the measurements of the magnetometer due to changes in heading may be reduced or counteracted and measurement accuracy may be improved.

Figure 4E:
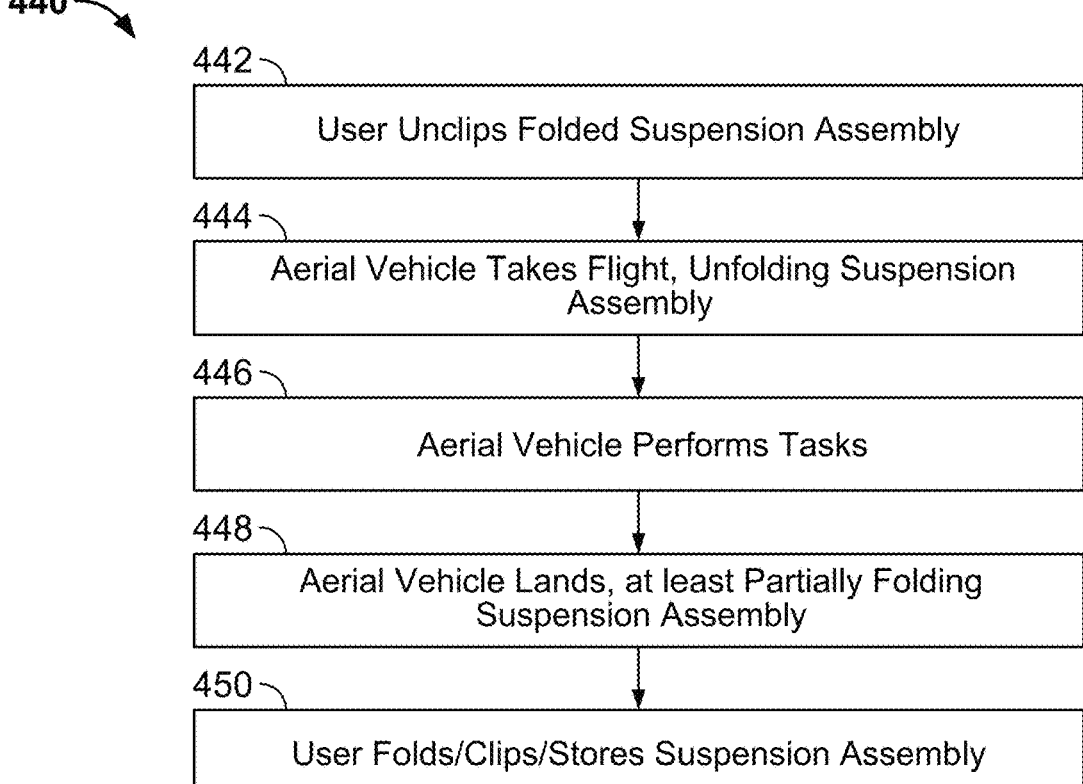
FIG. 4E is a flow diagram illustrating an embodiment of a process for utilizing a suspension assembly with an aerial vehicle and a magnetometer.

FIG. 4E is a flow diagram illustrating an embodiment of a process for utilizing a suspension assembly with an aerial vehicle and a magnetometer. In various embodiments, process 440 is implemented using suspension assembly 104, suspension assembly 154, suspension assembly portion 400, etc. In the embodiment shown, in 442, a user (e.g., an operator of the aerial vehicle) unclips the suspension assembly. The suspension assembly is folded into a compact tessellated package and may not unfold in response to the user unclipping the suspension assembly. In 444, the aerial vehicle takes flight, unfolding the suspension assembly. In various embodiments, the suspension assembly unfolds at least in part due to gravity, to tension of the bending of a flexible cable (e.g., in an internal channel of the suspension assembly), etc. The user may not need to unfold the suspension assembly. Thus case of use of the suspension assembly may be improved. In 446, the aerial vehicle performs any appropriate tasks (e.g., mapping, surveying, ordnance detection, etc.) with a magnetometer coupled to the suspension assembly. For example, the aerial vehicle may record magnetometer measurements across an area, return to its original location, and land. In 448, the aerial vehicle lands, at least partially folding the suspension assembly. For example, the suspension assembly may form an 'L' shape as the aerial vehicle lands, reducing the interference of the suspension assembly in the operation of the aerial vehicle during its landing. In 450, in various embodiments, the user folds, clips, stores, or otherwise manipulates the suspension assembly as desired. In some embodiments, (e.g., in response to there being more tasks for the aerial vehicle to perform), the user may not need to manipulate the suspension assembly and 450 is omitted.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

an enclosure configured to house a sensor or transmission device, wherein the enclosure includes a first housing section and a second housing section and a joint link pivotably coupling the first housing section to the second housing section about pivot axes such that the first housing section and the second housing section are movable between an axially aligned operational position and a folded storage position in which the first housing section and the second housing section lie alongside one another; and a suspension assembly comprising:

a plurality of links;

a plurality of hinge joints serially interconnecting adjacent links of the plurality of links such that the suspension assembly is foldable into a compact tessellated package;

a plurality of fasteners configured to secure the suspension assembly in the compact tessellated package;

a first end configured to couple to an aerial vehicle; and a second end configured to couple to the enclosure;

wherein the suspension assembly is configured to be torsion-resistant.

2. The system of claim 1, further comprising a latch releasably securing the first housing section and the second housing section in the axially aligned operational position.

3. The system of claim 1, further comprising a retention member releasably securing the first housing section and the second housing section in the folded storage position.

4. The system of claim 1, wherein the suspension assembly is a pendulous rod.

5. The system of claim 1, wherein the suspension assembly is pivotable about two axes.

6. The system of claim 1, wherein the plurality of links comprises a plurality of elongated rigid links disposed end-to-end.

7. The system of claim 1, wherein each hinge joint of the plurality of hinge joints defines a single rotation axis and successive rotation axes are oriented substantially orthogonally to one another such that the suspension assembly is foldable into the compact tessellated package.

8. The system of claim 1, wherein each hinge joint of the plurality of hinge joints comprises a rotation-limiting surface restricting relative angular displacement between the adjacent links.

9. The system of claim 1, wherein the compact tessellated package fits between the aerial vehicle and the ground while the aerial vehicle is in a grounded state.

10. The system of claim 1, wherein the second end of the suspension assembly comprises a keyed male inserter.

11. The system of claim 10, wherein an end of the enclosure comprises a complementarily keyed female receiver.

12. The system of claim 11, wherein the enclosure comprises at least one spring-biased locking pin mounted to the complementarily keyed female receiver and automatically engageable with a locking aperture in the keyed male inserter upon insertion of the keyed male inserter into the complementarily keyed female receiver in a specific orientation.

13. The system of claim 12, wherein the enclosure comprises at least one manually actuatable slider mounted to the enclosure and operatively connected to the at least one spring-biased locking pin to withdraw the at least one spring-biased locking pin from the locking aperture to permit removal of the keyed male inserter.

14. The system of claim 11, wherein the enclosure comprises at least one spring configured to oppose insertion of the keyed male inserter into the complementarily keyed female receiver.

15. The system of claim 1, further comprising a flexible cable, wherein the suspension assembly includes an internal channel for the flexible cable.

16. The system of claim 15, wherein the flexible cable electrically connects the enclosure and the aerial vehicle.

17. The system of claim 15, wherein the suspension assembly is foldable into a compact tessellated package and the internal channel is configured to allow for bending of the flexible cable.

18. The system of claim 17, wherein tension of the bending of the flexible cable assists in unfolding the suspension assembly, dampens swinging oscillations and/or increases its unfolded rigidity.

19. The system of claim 1, wherein, using the plurality of hinge joints, the adjacent links of the plurality of links are able to rotate 180 degrees from axial alignment to fold the suspension assembly into the compact tessellated package.

20. A system, comprising:
an aerial vehicle; and a sensing system coupled to the aerial vehicle, the sensing system comprising:
an enclosure configured to house a sensor or transmission device, wherein the enclosure includes a first housing section and a second housing section and a joint link pivotably coupling the first housing section to the second housing section about pivot axes such that the first housing section and the second housing section are movable between an axially aligned operational position and a folded storage position in which the first housing section and the second housing section lie alongside one another; and
a suspension assembly comprising:
a plurality of links;
a plurality of hinge joints serially interconnecting adjacent links of the plurality of links such that the suspension assembly is foldable into a compact tessellated package;
a plurality of fasteners configured to secure the suspension assembly in the compact tessellated package:
a first end configured to couple to the aerial vehicle; and
a second end configured to couple to the enclosure;
wherein the suspension assembly is configured to be torsion-resistant.

21. A suspension assembly, comprising:
a plurality of links;
a plurality of hinge joints serially interconnecting adjacent links of the plurality of links such that the suspension assembly is foldable into a compact tessellated package;
a plurality of fasteners configured to secure the suspension assembly in the compact tessellated package;
a first end configured to be coupled to an aerial vehicle; and
a second end configured to be coupled to an enclosure, wherein the suspension assembly is configured to be torsion-resistant.

22. The suspension assembly of claim 21, wherein the suspension assembly is a pendulous rod.

23. The suspension assembly of claim 21, wherein the suspension assembly is pivotable about two axes.

24. The suspension assembly of claim 21, wherein the plurality of links comprises a plurality of elongated rigid links disposed end-to-end.

25. The suspension assembly of claim 21, wherein each hinge joint of the plurality of hinge joints defines a single rotation axis and successive rotation axes are oriented substantially orthogonally to one another such that the suspension assembly is foldable into the compact tessellated package.

26. The suspension assembly of claim 21, wherein each hinge joint of the plurality of hinge joints comprises a rotation-limiting surface restricting relative angular displacement between the adjacent links.

27. The suspension assembly of claim 21, wherein the compact tessellated package fits between the aerial vehicle and the ground while the aerial vehicle is in a grounded state.

28. The suspension assembly of claim 21, wherein the second end of the suspension assembly comprises a keyed male inserter.

29. The suspension assembly of claim 21, further comprising an internal channel for a flexible cable.

* * * * *